(12) United States Patent
Reznik

(10) Patent No.: US 6,304,718 B1
(45) Date of Patent: Oct. 16, 2001

(54) ELECTROLYTE ELECTRODE FOR ELECTROHEATING

(76) Inventor: David Reznik, 12690 Viscaino Rd., Los Altos Hills, CA (US) 94022

( * ) Notice: Subject to any disclaimer, the term of this patent is extended or adjusted under 35 U.S.C. 154(b) by 0 days.

(21) Appl. No.: 09/659,922

(22) Filed: Sep. 12, 2000

(51) Int. Cl.$^7$ ................................ H05B 3/60; F22B 1/30
(52) U.S. Cl. ............................ 392/321; 392/338; 99/358
(58) Field of Search ................................... 392/321, 311, 392/314, 320, 338; 99/358

(56) References Cited

U.S. PATENT DOCUMENTS

| | | | |
|---|---|---|---|
| 4,378,846 | * | 4/1983 | Brock .................................. 166/303 |
| 4,434,357 | * | 2/1984 | Simpson et al. ..................... 392/320 |
| 4,739,140 | | 4/1988 | Reznik . |
| 5,084,153 | * | 1/1992 | Mosse et al. ........................ 204/228 |
| 5,583,960 | | 12/1996 | Reznik . |
| 5,636,317 | | 6/1997 | Reznik . |
| 5,863,580 | | 1/1999 | Reznik . |
| 6,088,509 | | 6/2000 | Reznik . |

OTHER PUBLICATIONS

Raztek Technologies, "Rapid Cooling", http://www.raztek.com/cooling.html, 1998, pp. 1–2.

Raztek Publications/Technical Information: "Electroheating™", pp. 1–5, 1998, http://www.raztek.com/techinfo.html.

Raztek Publications/Technical Information: "Rapid Vacuum Cooler (CIP)", pp. 11–14, 1998, http://www.raztek.com/techinfo.html.

Raztek Publications/Technical Information: "Ohmic Heating of Fluids Foods", Food Technology May 1996, pp. 5–11 (based on a paper presented during IFT Food Engineering Division Symposium, *Ohmic Heating for Thermal Processing of Foods: Government, Industry, and Academic Perspective*, Annual Meeting of the Institute of Food Technologists, Anaheim, CA, Jun. 3–7, 1995).

\* cited by examiner

*Primary Examiner*—Teresa Walberg
*Assistant Examiner*—Thor Campbell
(74) *Attorney, Agent, or Firm*—Darby & Darby

(57) ABSTRACT

Electroheating apparatus including a conduit adapted for flow therethrough of a flowable product having a pressure, an electrode circumferentially surrounding the conduit, the electrode defining a first annulus between an inner wall of the electrode and an outer wall of the conduit, an electrolytic solution disposed in the first annulus which contacts the outer wall of the conduit, an electrical power source connected to the electrode for passing an electrical current through the electrolytic solution, a generally electrically non-conductive sleeve circumferentially surrounding the conduit axially adjacent the electrode, the non-conductive sleeve defining a second annulus between the inner wall of the sleeve and the outer wall of the conduit, and a generally electrically non-conductive fluid disposed in the second annulus which contacts the outer wall of the conduit.

9 Claims, 1 Drawing Sheet

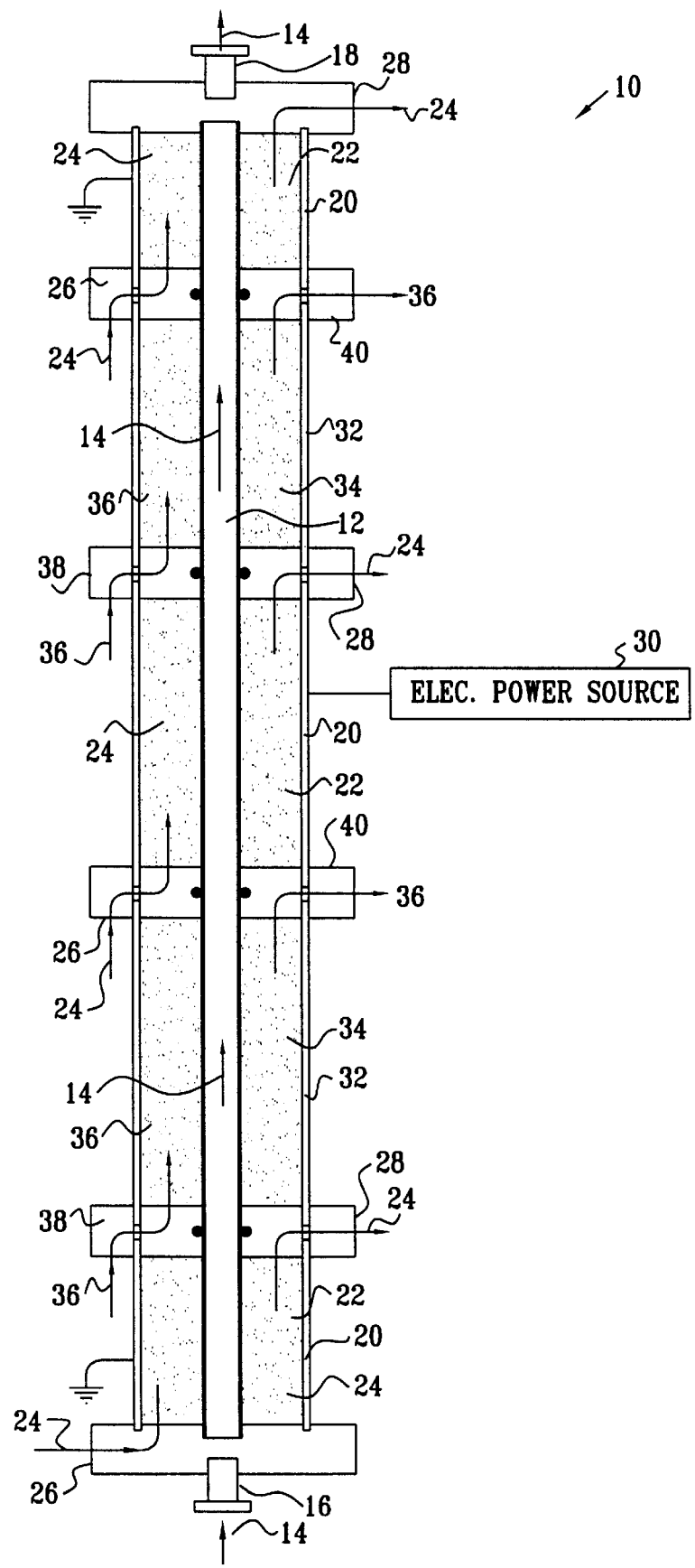

ELECTROLYTE ELECTRODE FOR ELECTROHEATING

FIELD OF THE INVENTION

The present invention relates to generally to methods and apparatus for electroheating of foodstuffs and particularly to electroheating

BACKGROUND OF THE INVENTION

Electroheating is a method of rapidly heating substances, such as solid or liquid foodstuffs, by passing a current through the material, wherein the material acts as a resistive heater. Such rapid heating methods are disclosed in applicant/assignee's U.S. Pat. Nos. 4,739,140; 5,583,960; 5,636,317 and 5,863,580, the disclosures of which are incorporated herein by reference.

The fluid to be electroheated must be in contact with a large area of the electrode in order to prevent a high current density on the electrode that might lead to arcing. U.S. Pat. Nos. 5,583,960; 5,636,317 and 5,863,580 describe apparatus for increasing the electrode contacting area and thereby reducing the current density. The apparatus includes a narrow tube which terminates at both ends thereof in funnel-like cones. The electrode is the size of the large base of each cone.

A problem exists when attempting to electroheat semi-solid materials, such as coagulated proteins or dough. It is difficult to form good electrical contact between a flat electrode and the semi-solid material. The narrow tube apparatus of the abovementioned patents solves this problem by providing good contact area and low current density at the cone ends. However, although this arrangement provides low current density, it increases the dwell time in the electroheater, since the volume of the cones is much larger than that of the narrow tube. The increased dwell time presents another problem by making it difficult if not impossible to pass the semi-solid material through the electrode, since the semi-solid material tends to thicken and harden during the dwell time.

Another problem associated with electroheating of a biological fluid, is that the fluid contacts the electrode. The electrodes are usually made of graphite, which is preferable to metal because metal ions can dissolve in the contacting fluid, whereas graphite does not. Nevertheless, even with graphite electrodes, there is an electrolytic reaction with the fluid, and the fluid becomes reduced. Although in some cases this can be beneficial, such as in recovery of oxidized vitamin C in electroheated orange juice, nevertheless in some cases this may not be desirable.

Applicant/assignee's U.S. Pat. No. 6,088,509, the disclosure of which is incorporated herein by reference, describes an electrolytic bridge that solves the abovementioned problems. The electrode of the electrolytic bridge does not come into direct contact with the flowable material which is to be heated. The electrode is generally conical in shape and defines a chamber which is also conical. The chamber is filled with an electrolytic solution which wets a porous, electrically non-conductive conduit through which the flowable material is passed. Electrical current passes from the electrode through the electrolytic solution to the conduit and into the flowable material, thereby electroheating the material.

Due to the conical shape of the electrode and chamber, the current is not concentrated at the upstream base of the chamber, but rather is distributed along the length of the conduit and the electrode, thereby ensuring a relatively low current density. Most preferably, the electrolytic solution is chosen to have an electrical conductivity such that, taking into consideration the electrical conductivity of the flowable material, there is generally an equal distribution of current through the flowable material along the entire length of the conduit. There is a short dwell time because the flowable material flows through a cylindrical conduit rather than through a cone.

However, even with the electrolytic bridge of U.S. Pat. No. 6,088,509, certain coagulation problems can still occur. Coagulation of proteins occurs when a particle is caught and is delayed in the electroheater. The high electrical current heats the snagged particle up to ignition temperatures. Once the particle burns, it forms an obstacle to the flow and more proteinaceous matter coagulates and burns. This can also lead to arcing, since the carbon is more conductive than the flowable material, meaning that the current prefers to flow through the carbon. When using plastic tubes, the hot carbon burns the plastic.

In order to prevent the risk of arcing, the material should flow very fast without any obstacles. Even a change in diameter of the tube through which the material flows can lead to deposition of conductive proteins that eventually tend to burn. Although the porous tube and electrolytic bridge of U.S. Pat. No. 6,088,509 enable a straight line flow with no appreciable change in diameter, nevertheless the porous tube must still be connected to a non-conductive tube, and some flowable material can get caught at the connection between the two tubes. After processing a large amount of material, there can be an accumulation of caught material which then burns.

SUMMARY OF THE INVENTION

The present invention seeks to provide improved methods and apparatus for electroheating flowable materials, which solve the abovementioned problem of the prior art. The electroheater includes a straight, porous (preferably ceramic) conduit with electrodes that are preferably constructed as described in U.S. Pat. No. 6,088,509. In contrast to U.S. Pat. No. 6,088,509, the portion of the porous conduit which must be non-conductive is surrounded by a cylinder that is filled with an electrically non-conductive fluid, e.g., water, air or oil, under the same pressure as that of the flowing product or higher. Both the electrolyte and the non-conductive fluid are supplied under pressure by pumps. Since the pressure of the electrolyte and the non-conductive fluid is greater than or equal to that of the flowing product, the product does not tend to enter the pores of the porous conduit. In this manner, the product does not enter or accumulate in the pores of the conduit, and no particles are caught and delayed in the electroheater. Thus the present invention solves the problem of burning, coagulated particles, and prevents fouling of the electroheating apparatus.

There is thus provided in accordance with a preferred embodiment of the present invention electroheating apparatus including a conduit adapted for flow therethrough of a flowable product having a pressure, an electrode circumferentially surrounding the conduit, the electrode defining a first annulus between an inner wall of the electrode and an outer wall of the conduit, an electrolytic solution disposed in the first annulus which contacts the outer wall of the conduit, an electrical power source connected to the electrode for passing an electrical current through the electrolytic solution, a Generally electrically non-conductive sleeve circumferentially surrounding the conduit axially adjacent the electrode, the non-conductive sleeve defining a second annulus between the inner wall of the sleeve and the outer wall of the conduit, and a generally electrically non-conductive fluid disposed in the second annulus which contacts the outer wall of the conduit.

In accordance with a preferred embodiment of the present invention the conduit is constructed of a porous, electrically non-conductive material, and wherein the electrolytic solution and the non-conductive fluid are at a pressure not less than the pressure of the flowable product, such that the product does not tend to enter pores of the conduit.

Further in accordance with a preferred embodiment of the present invention a flowable product flows through the conduit, wherein electrical current passes from the electrode through the electrolytic solution to the conduit to the flowable product, thereby electroheating, the flowable product. Preferably the electrolytic solution is chosen to have an electrical conductivity 30 such that there is Generally an equal distribution of electrical current through the flowable product along a length of the conduit opposite the electrode.

Still further in accordance with a preferred embodiment of the present invention a plurality of the electrodes are axially spaced from each other by the non-conductive sleeve, wherein one of the electrodes is a live electrode and another is grounded.

In accordance with a preferred embodiment of the present invention an inlet and an outlet are provided for flow therethrough of the electrolytic solution into and from the first annulus. Preferably, an inlet and an outlet are also provided for flow therethrough of the non-conductive fluid into and from the second annulus, as well as an inlet and an outlet for flow therethrough of a flowable product. The non-conductive fluid may be water, air or oil, for example.

BRIEF DESCRIPTION OF THE DRAWINGS

The present invention will be understood and appreciated more fully from the following detailed description, taken in conjunction with the single drawing which is a simplified illustration of electroheating apparatus constructed and operative in accordance with a preferred embodiment of the present invention.

DETAILED DESCRIPTION OF PREFERRED EMBODIMENTS

Reference is now made to the single drawing which illustrates electroheating apparatus 10 constructed and operative in accordance with a preferred embodiment of the present invention.

Electroheating apparatus 10 preferably includes a conduit 12 adapted for flow therethrough of a flowable product 14, such as minced meat, dough, egg, or other thick proteinaceous matter, or even diced tomatoes or fruit slices, for example. Conduit 12 is preferably constructed of a porous, electrically non-conductive material, such as ceramic. Conduit 12 preferably has an inlet 16 and an outlet 18 for flow therethrough of flowable product 14.

One or more electrodes 20 preferably circumferentially surround conduit 12. In the illustrated embodiment, there are three such electrodes 20, although other numbers of electrodes may also be used. Each electrode 20 defines a first annulus 22 between an inner wall of the electrode and an outer wall of conduit 12. An electrolytic solution 24 (such as an NaCl solution) is disposed in first annulus 22 which contacts the outer wall of conduit 12. Electrolytic solution 24 is preferably supplied by a pump (not shown), wherein electrolytic solution 24 flows into first annulus 22 via an inlet 26 and exits via an outlet 28. An electrical power source 30 is preferably connected to electrode 20 for passing an electrical current through electrolytic solution 24. In the illustrated embodiment, the middle electrode 20 is the live electrode, whereas the upper and lower electrodes 20 are grounded.

A generally electrically non-conductive sleeve 32 (e.g., made of plastic) preferably circumferentially surrounds conduit 12 axially adjacent electrode 20. Non-conductive sleeve 32 defines a second annulus 34 between the inner wall of sleeve 32 and the outer wall of conduit 12. A generally electrically non-conductive fluid 36, e.g., water, air or oil, is preferably disposed in second annulus 34 and contacts the outer wall of conduit wherein non-conductive fluid 36 is preferably supplied by a pump (not shown), wherein non-conductive fluid 36 flows into second annulus 34 via an inlet 38 and exits via an outlet 40. It is seen that in the illustrated embodiment, the three electrodes 20 are axially spaced from each other by two non-conductive sleeves 32.

As flowable product 14 flows through conduit 12, electrical current passes from electrode 20 through electrolytic solution 24 to conduit 12 to flowable product 14. The current flows to the second electrode through the porous wall of conduit 12, then through electrolytic solution 24, to the neighboring electrode 20, thereby completing the circuit and electroheating flowable product 14. The electrodes are preferably made of graphite to prevent contamination of the electrolyte with metal ions which may enter product 14. Preferably electrolytic solution 24 is chosen to have an electrical conductivity such that there is generally an equal distribution of electrical current through flowable product 14 along the length of conduit 12 opposite electrode 20. One preferred way of achieving this is by constructing electrodes 20 to be generally cone-shaped, as is described in U.S. Pat. No. 6,088,509.

In accordance with a preferred embodiment of the present invention, electrolytic solution 24 and non-conductive fluid 36 are at a pressure not less than the pressure of flowable product 14, such that product 14 does not tend to enter pores of conduit 12. In this manner, product 14 does not enter or accumulate in the pores of conduit 12, and no particles are caught and delayed in electroheating apparatus 10. Thus the present invention solves the problem of burning, coagulated particles, and prevents fouling of electroheating apparatus 10.

Alternatively, the problem of the prior art can be solved by the invention by using the flowable product 14 as the electrolytic solution 24 itself. For example, in one embodiment, the product 14 enters first annulus 22 as the electrolytic solution and seeps through the porous wall of conduit 12 to join the rest of product 14 flowing through conduit 12. Of course, vice versa, the product 14 flowing in conduit 12 can seep through the porous wall of the conduit into first annulus 22. In any case, it is clear that such an arrangement prevents particles from being caught and delayed in electroheating apparatus 10.

It will be appreciated by persons skilled in the art that the present invention is not limited to what has been particularly shown and described hereinabove. Rather, the scope of the present invention is defined only by the claims that follow.

What is claimed is:

1. Electroheating apparatus comprising:
   a conduit adapted for flow therethrough of a flowable product having a pressure;

an electrode circumferentially surrounding said conduit, said electrode defining a first annulus between an inner wall of said electrode and an outer wall of said conduit;

an electrolytic solution disposed in said first annulus which contacts the outer wall of said conduit;

an electrical power source connected to said electrode for passing an electrical current through said electrolytic solution;

a generally electrically non-conductive sleeve circumferentially surrounding said conduit axially adjacent said electrode, said non-conductive sleeve defining a second annulus between the inner wall of said sleeve and the outer wall of said conduit; and a generally electrically non-conductive fluid disposed in said second annulus which contacts the outer wall of said conduit.

2. Apparatus according to claim 1 wherein said conduit is constructed of a porous, electrically non-conductive material, and wherein said electrolytic solution and said non-conductive fluid are at a pressure not less than the pressure of the flowable product, such that the product does not tend to enter pores of said conduit.

3. Apparatus according to claim 1 and further comprising a flowable product flowing through said conduit, wherein electrical current passes from said electrode through said electrolytic solution to said conduit to said flowable product, thereby electroheating said flowable product.

4. Apparatus according to claim 1 wherein said electrolytic solution is chosen to have an electrical conductivity such that there is generally an equal distribution of electrical current through said flowable product along a length of said conduit opposite said electrode.

5. Apparatus according to claim 1 and further comprising a plurality of said electrodes axially spaced from each other by said non-conductive sleeve, wherein one of said electrodes is a live electrode and another is grounded.

6. Apparatus according to claim 1 and further comprising an inlet and an outlet for flow therethrough of said electrolytic solution into and from said first annulus.

7. Apparatus according to claim 1 and further comprising an inlet and an outlet for flow therethrough of said non-conductive fluid into and from said second annulus.

8. Apparatus according to claim 1 wherein said conductive comprises an inlet and an outlet adapted for flow therethrough of a flowable product.

9. Apparatus according to claim 1 wherein said non-conductive fluid comprises at least one of water, air and oil.

* * * * *